US012585515B2

(12) United States Patent　　(10) Patent No.:　US 12,585,515 B2
Ozga et al.　　(45) Date of Patent:　　Mar. 24, 2026

(54) SYSTEMS AND METHODS FOR DISTRIBUTED SYSTEM STATE ESTIMATION

(71) Applicant: STEERING SOLUTIONS IP HOLDING CORPORATION, Saginaw, MI (US)

(72) Inventors: Michal Ozga, Silesia (PL); Michal Lewecki, Silesia (PL); Mateusz Ostafin, Silesia (PL)

(73) Assignee: Steering Solutions IP Holding Corporation, Saginaw, MI (US)

( * ) Notice: Subject to any disclaimer, the term of this patent is extended or adjusted under 35 U.S.C. 154(b) by 196 days.

(21) Appl. No.: 18/502,298

(22) Filed: Nov. 6, 2023

(65) Prior Publication Data

US 2025/0147829 A1　May 8, 2025

(51) Int. Cl.
*G06F 11/07*　(2006.01)
*B60W 10/20*　(2006.01)

(52) U.S. Cl.
CPC ......... *G06F 11/0709* (2013.01); *B60W 10/20* (2013.01)

(58) Field of Classification Search
CPC ........................... G06F 11/0709; B60W 10/20

USPC ......................................................... 701/44
See application file for complete search history.

(56) References Cited

U.S. PATENT DOCUMENTS

2007/0156889 A1* 7/2007 Bhrara ................ G06F 11/0709
　　　　　　　　　　　　　　　　　　709/224
2018/0239658 A1* 8/2018 Whitner .............. G06F 11/3409
2022/0324434 A1* 10/2022 Erlenbeck ............... H04L 12/40

* cited by examiner

*Primary Examiner* — Yi-Kai Wang
(74) *Attorney, Agent, or Firm* — Dickinson Wright PLLC

(57)　　　　ABSTRACT

A method for distributed system state estimation includes receiving, from each signal path of a plurality of signal paths associated with a computing system, a quality indicator and a partial redundancy classifier. The method also includes generating a communication interface qualifier and a system redundancy diagnostic status based on the quality indicator and the partial redundancy classifier, receiving system availability information for at least one component associated with a respective signal path, and determining a redundancy topology classification and a redundancy state. The method also includes receiving, for the respective signal path, resource availability status information, and generating, for the respective signal path, a redundant system response based on the resource availability status information for the respective signal path, the redundancy topology classification for the respective signal path, and the redundancy state for the respective signal path.

20 Claims, 7 Drawing Sheets

MOST
MEDIA ORIENTED SYSTEMS TRANSPORT
ETHERNET AVB (AUDIO VIDEO BRIDGING)
ETHERNET TSN (TIME-SENSITIVE NETWORKING)

LIN
LOCAL INTERCONNECT NETWORK
MULTIFUNCTION KEYLESS SYSTEM

CAN
CONTROLLER AREA NETWORK
COLLISION DETECTION SYSTEM

FlexRay
BRAKE-BY-WIRE SYSTEM

ETHERNET

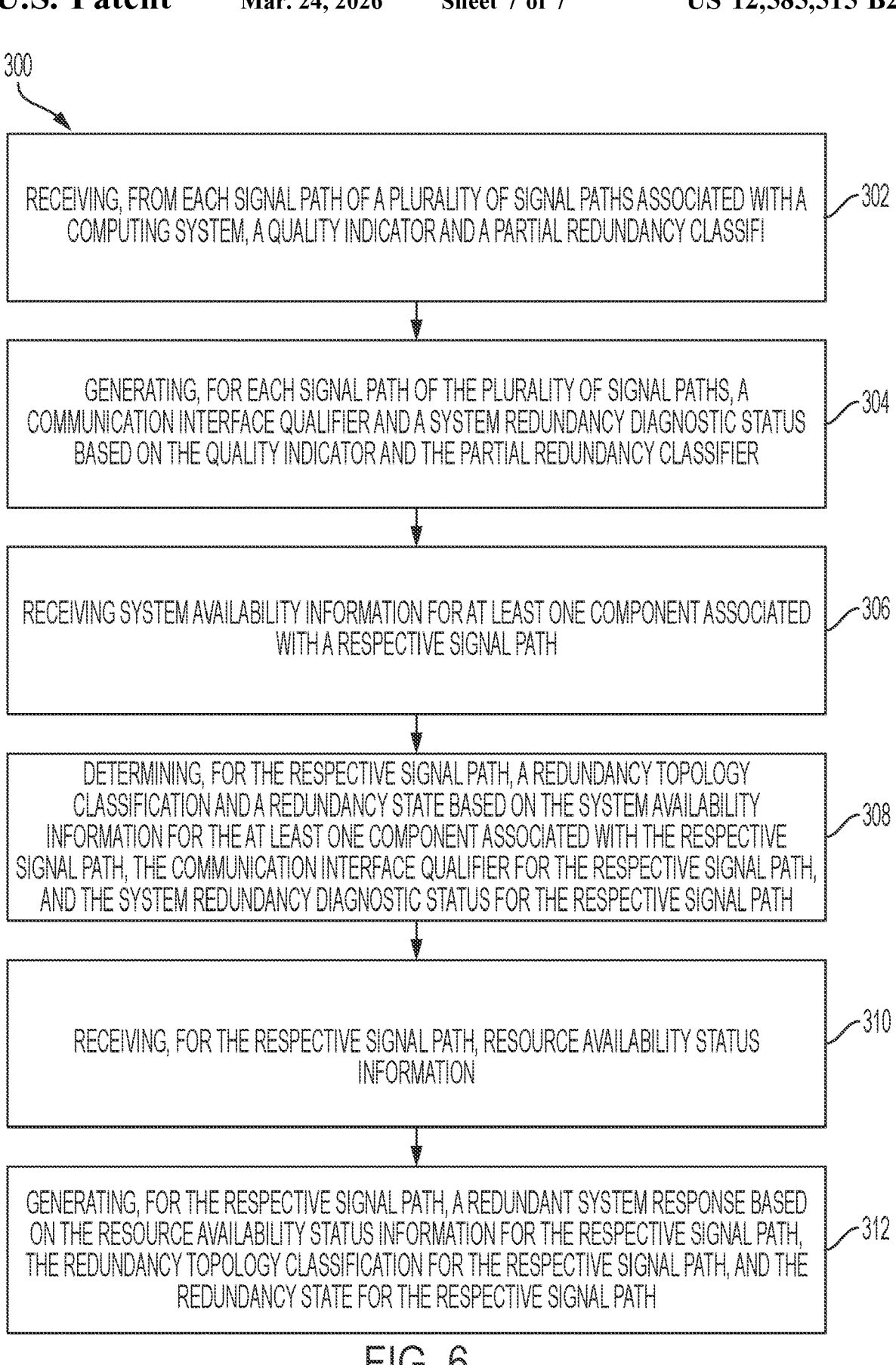

300

RECEIVING, FROM EACH SIGNAL PATH OF A PLURALITY OF SIGNAL PATHS ASSOCIATED WITH A COMPUTING SYSTEM, A QUALITY INDICATOR AND A PARTIAL REDUNDANCY CLASSIFI — 302

GENERATING, FOR EACH SIGNAL PATH OF THE PLURALITY OF SIGNAL PATHS, A COMMUNICATION INTERFACE QUALIFIER AND A SYSTEM REDUNDANCY DIAGNOSTIC STATUS BASED ON THE QUALITY INDICATOR AND THE PARTIAL REDUNDANCY CLASSIFIER — 304

RECEIVING SYSTEM AVAILABILITY INFORMATION FOR AT LEAST ONE COMPONENT ASSOCIATED WITH A RESPECTIVE SIGNAL PATH — 306

DETERMINING, FOR THE RESPECTIVE SIGNAL PATH, A REDUNDANCY TOPOLOGY CLASSIFICATION AND A REDUNDANCY STATE BASED ON THE SYSTEM AVAILABILITY INFORMATION FOR THE AT LEAST ONE COMPONENT ASSOCIATED WITH THE RESPECTIVE SIGNAL PATH, THE COMMUNICATION INTERFACE QUALIFIER FOR THE RESPECTIVE SIGNAL PATH, AND THE SYSTEM REDUNDANCY DIAGNOSTIC STATUS FOR THE RESPECTIVE SIGNAL PATH — 308

RECEIVING, FOR THE RESPECTIVE SIGNAL PATH, RESOURCE AVAILABILITY STATUS INFORMATION — 310

GENERATING, FOR THE RESPECTIVE SIGNAL PATH, A REDUNDANT SYSTEM RESPONSE BASED ON THE RESOURCE AVAILABILITY STATUS INFORMATION FOR THE RESPECTIVE SIGNAL PATH, THE REDUNDANCY TOPOLOGY CLASSIFICATION FOR THE RESPECTIVE SIGNAL PATH, AND THE REDUNDANCY STATE FOR THE RESPECTIVE SIGNAL PATH — 312

FIG. 6

SYSTEMS AND METHODS FOR DISTRIBUTED SYSTEM STATE ESTIMATION

TECHNICAL FIELD

This disclosure relates to distributed computing systems, and in particular to systems and methods for distributed system state estimation.

BACKGROUND

A vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an electronic power steering (EPS) system, a steer-by-wire (SbW) steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

SUMMARY

This disclosure relates generally to steering systems.

An aspect of the disclosed embodiments includes a method for distributed system state estimation. The method includes receiving, from each signal path of a plurality of signal paths associated with a computing system, a quality indicator and a partial redundancy classifier. The method also includes generating, for each signal path of the plurality of signal paths, a communication interface qualifier and a system redundancy diagnostic status based on the quality indicator and the partial redundancy classifier. The method also includes receiving system availability information for at least one component associated with a respective signal path, and determining, for the respective signal path, a redundancy topology classification and a redundancy state based on the system availability information for the at least one component associated with the respective signal path, the communication interface qualifier for the respective signal path, and the system redundancy diagnostic status for the respective signal path. The method also includes receiving, for the respective signal path, resource availability status information, and generating, for the respective signal path, a redundant system response based on the resource availability status information for the respective signal path, the redundancy topology classification for the respective signal path, and the redundancy state for the respective signal path.

Another aspect of the disclosed embodiments includes a system for distributed system state estimation. The system includes a processor, and a memory. The memory includes instructions that, when executed by the processor, cause the processor to: receive, from each signal path of a plurality of signal paths associated with a computing system, a quality indicator and a partial redundancy classifier; generate, for each signal path of the plurality of signal paths, a communication interface qualifier and a system redundancy diagnostic status based on the quality indicator and the partial redundancy classifier; receive system availability information for at least one component associated with a respective signal path; determine, for the respective signal path, a redundancy topology classification and a redundancy state based on the system availability information for the at least one component associated with the respective signal path, the communication interface qualifier for the respective signal path, and the system redundancy diagnostic status for the respective signal path; receive, for the respective signal path, resource availability status information; and generate, for the respective signal path, a redundant system response based on the resource availability status information for the respective signal path, the redundancy topology classification for the respective signal path, and the redundancy state for the respective signal path.

Another aspect of the disclosed embodiments includes an apparatus for distributed system state estimation. The apparatus includes a processor, and a memory. The memory includes instructions that, when executed by the processor, cause the processor to: receive, from each signal path of a plurality of signal paths associated with a vehicle, a quality indicator and a partial redundancy classifier; generate, for each signal path of the plurality of signal paths, a communication interface qualifier and a system redundancy diagnostic status based on the quality indicator and the partial redundancy classifier; receive system availability information for at least one component associated with a respective signal path; determine, for the respective signal path, a redundancy topology classification and a redundancy state based on the system availability information for the at least one component associated with the respective signal path, the communication interface qualifier for the respective signal path, and the system redundancy diagnostic status for the respective signal path; receive, for the respective signal path, resource availability status information; generate, for the respective signal path, a redundant system response based on the resource availability status information for the respective signal path, the redundancy topology classification for the respective signal path, and the redundancy state for the respective signal path; and, in response to a detected condition, selectively control at least one component of the vehicle based on the redundant system response.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flow diagram generally illustrating a distributed system state estimation method according to the principles of the present disclosure.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes various systems, such as a steering system, which may include an EPS steering system, a SbW steering system, a hydraulic steering system, or other suitable steering system and/or other suitable systems (e.g., such as a braking system, propulsion system, and the like). Such systems of the vehicle typically control various aspects of vehicle steering (e.g., including providing steering assist to an operator of the vehicle, controlling steerable wheels of the vehicle, and the like), vehicle propulsion, vehicle braking, and the like.

Typically, a critical aspect of steering systems is efficient and safe control over synchronous brushless direct current (BLDC) motors. Increasingly, there is a growing emphasis on road safety and dynamic development of autonomous control forces, which may include the implementation of mechanisms that increase the reliability of function delivery. Natural direction is providing function using redundant and distributed systems to mitigate the consequences of failure of individual redundant entities.

Accordingly, systems and methods, such as those described herein, configured to provide distribute system state estimation features, may be desirable. In some embodiments, the systems and methods described herein may be configured to control stand by redundancy (e.g., applied to a steering system, any other suitable system of a vehicle, and/or any other computing system).

Figure 3:
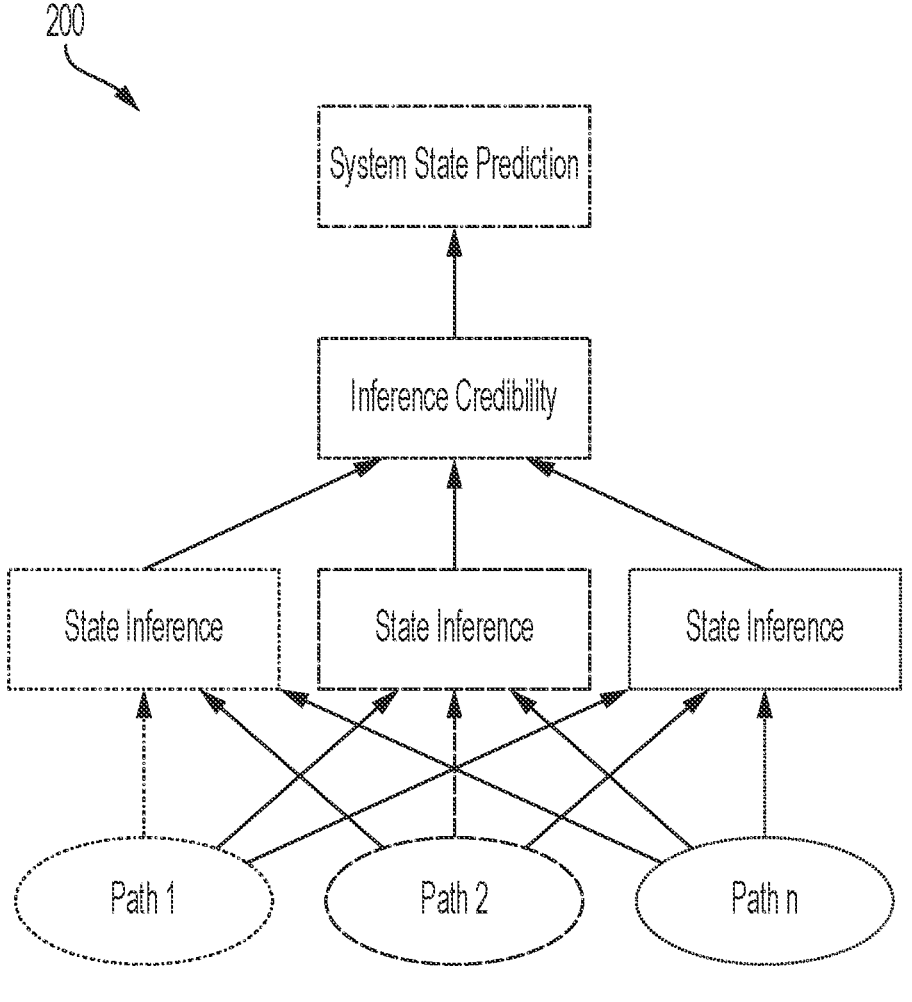
FIG. 3 generally illustrates a signal path process flow according to the principles of the present disclosure.

The systems and methods described herein may be configured to provide a standardized control process to manage stand by redundancy on different levels, as is generally illustrated in FIG. 3. The systems and methods described herein may be configured to achieve full system awareness determination by each redundant entity.

Figure 5:
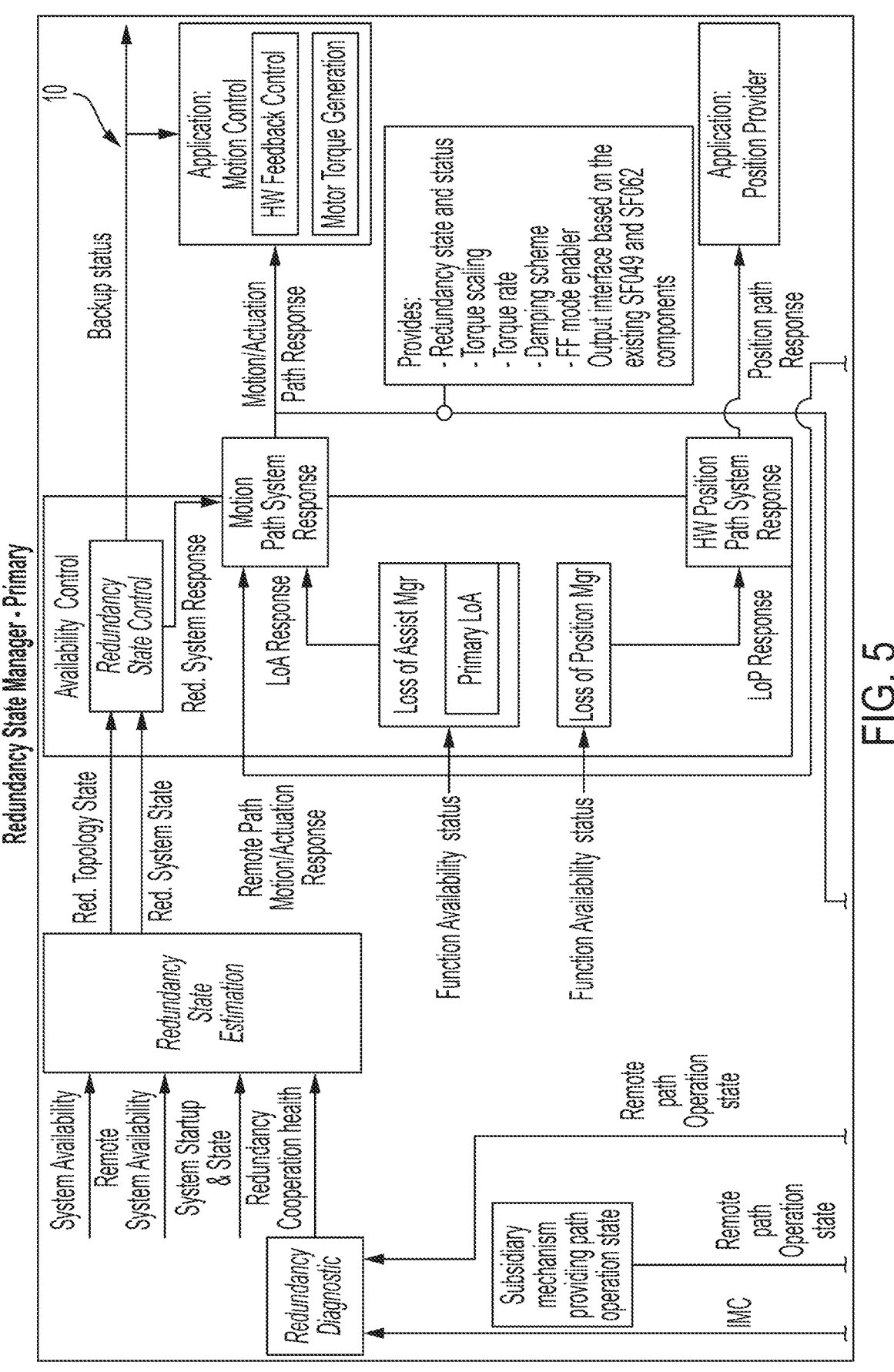
FIG. 5 generally illustrates a distribute system state estimation system architecture according to the principles of the present disclosure.
Figure 5:
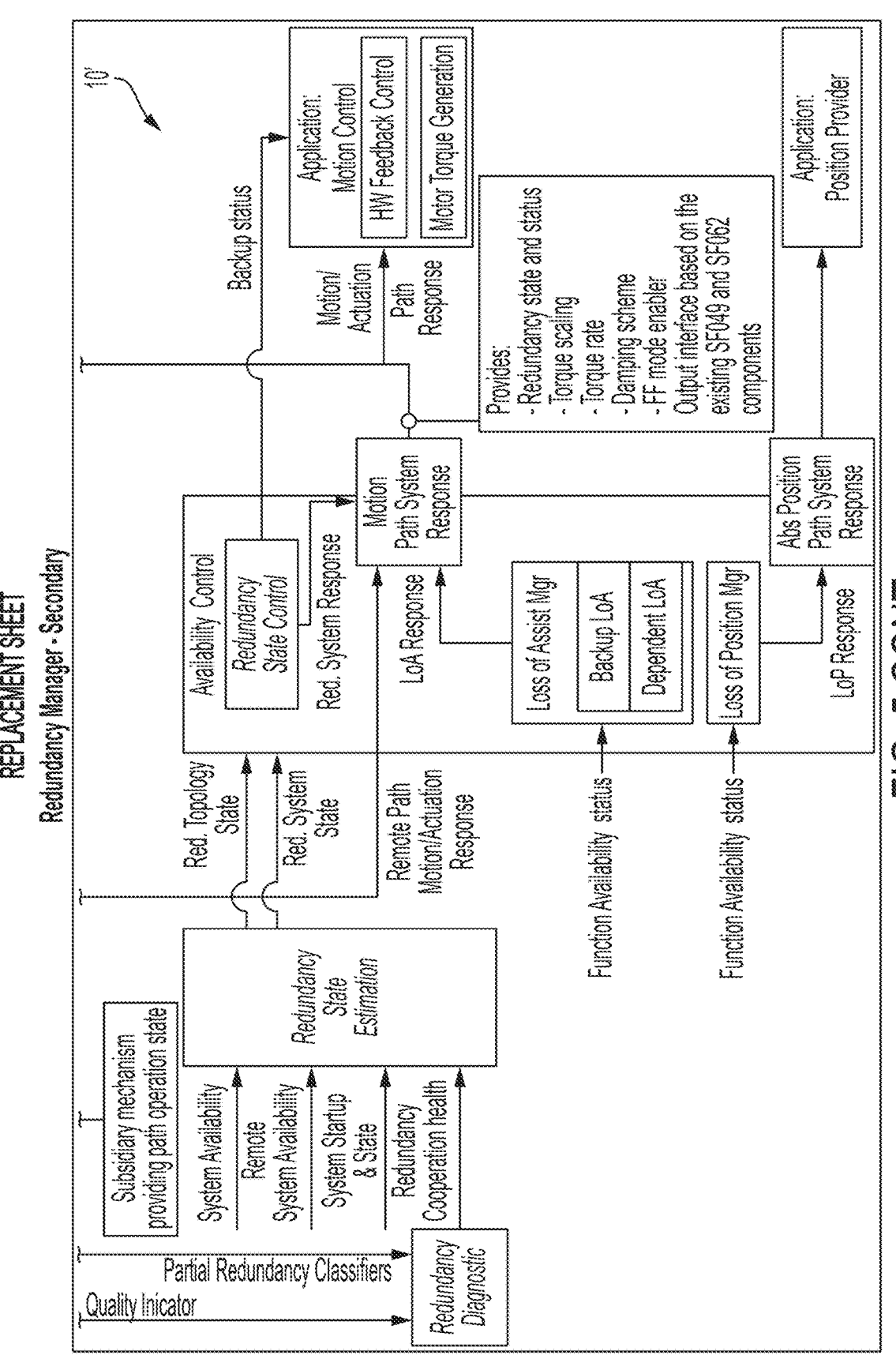

In some embodiments, the systems and methods described herein may be configured to use a unified core architectural solution (e.g., as is generally illustrated in FIG. 5), while omitting an external supervisor (e.g., hardware) unit. For example, an inferred, verified situational image of the redundant system may be used by the application layer for an optimal use of available distributed resources.

Figure 4:
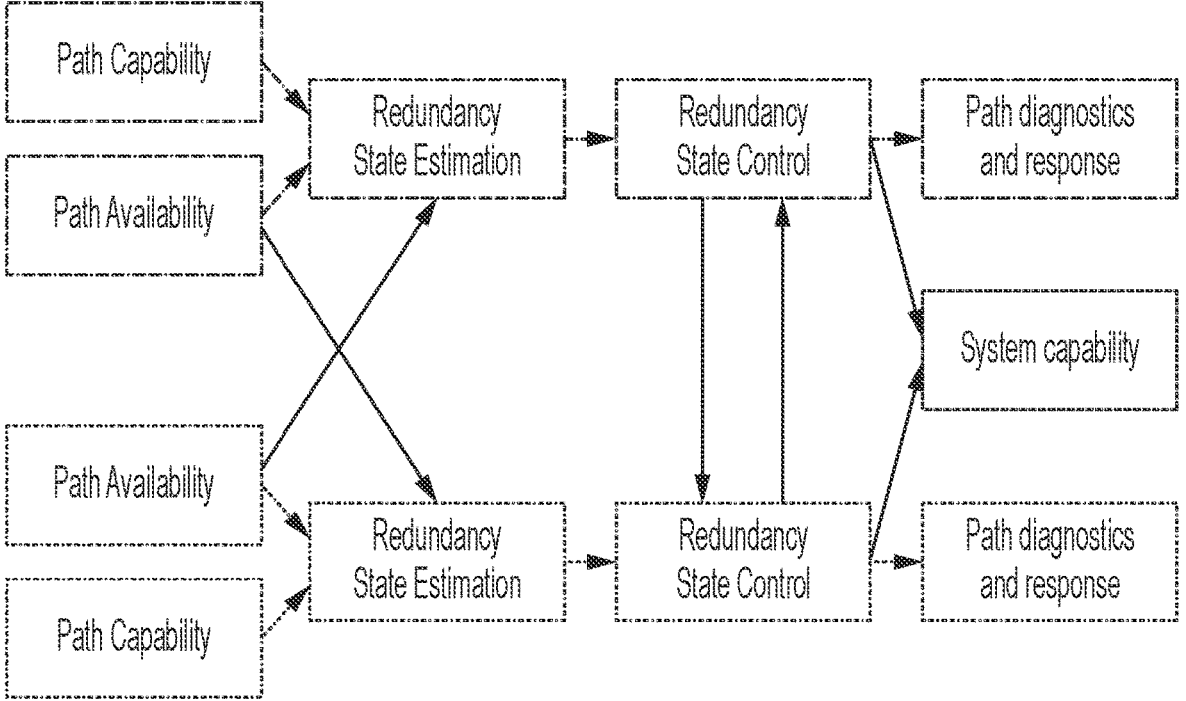
FIG. 4 generally illustrates an alternative signal path process flow according to the principles of the present disclosure.

With reference to FIG. 4, the systems and methods described herein may be configured to provide a mechanism that dynamically adjusting and reconfiguring a system response to provide an extension of feature (e.g., steering assist and/or other suitable feature) availability, detection of control path faults, and aggregation of a fail state premises.

The systems and methods described herein may be configured to provide inference about system awareness. The systems and methods described herein may be configured to determine (e.g., or infer, predict, and the like) the redundant system state based on reliable information and inference credibility diagnostics. The systems and methods described herein may be configured to determine local and system state redundant entities individually. The systems and methods described herein may be configured to analyze information that includes path availability and capabilities that, combined, define a system ability pool. The systems and methods described herein may be configured to exchange and compare processed information between redundant entities for an inference crosscheck. The systems and methods described herein may be configured to execute predefined (e.g., based on the entity role) diagnostic scenarios, in response to a disagreement of the information.

The systems and methods described herein may be configured to ensure individual control paths (e.g., entities) are fully capable and operational at system start (e.g., which may be referred to as redundant system startup), allocated in corresponding functionality.

The systems and methods described herein may be configured to, using acquired system awareness, dynamically infer current redundant system control topology including predefined roles and prevent control conflicts on redundant entity levels.

With further reference to FIG. 5, the systems and methods described herein may be configured to decompose the redundant system state estimation into three functions: redundancy diagnostic; redundancy state estimation; and redundancy state control.

The systems and methods described herein may be configured to provide redundancy diagnostics, which may include quantifying availability and performance of interconnection channels and verifying coherency of redundancy state inference between processing entities that constitute redundant system. The systems and methods described herein may be configured to receive inputs including quality indicators of interconnections and partial redundancy classifiers. The systems and methods described herein may be configured to provide outputs including communication interface qualifiers and system redundancy diagnostics status information.

The systems and methods described herein may be configured to provide redundancy state estimation, which may include performing classification of redundancy capabilities of the system. Additionally, or alternatively, the systems and methods described herein may be configured to support initialization and runtime coordination between processing paths. The systems and methods described herein may be configured to receive inputs including system availability, communication interface qualifiers, and system redundancy diagnostics status information. The systems and methods described herein may be configured to provide outputs that include redundancy topology classifications and redundancy state (e.g., global system state) information.

The systems and methods described herein may be configured to provide redundancy state control, which may include determining an operation state for each processing path and providing the operation state information to application specific functions. The systems and methods described herein may be configured to receive inputs including redundancy topology classification information, redundancy state (e.g., global system state), resource availability status information. The systems and methods described herein may be configured to provide outputs including redundant system response information.

In some embodiments, the systems and methods described herein may be configured to a system level overseer and/or an observer and situation awareness hubs that produces necessary system awareness for application purposes. The systems and methods described herein may be configured to provide a unified and scalable core architecture approach and/or solution that combines: system level redundancy and redundant system status determination; a crosschecking diagnostic mechanism for connected redundant entities; an unambiguous, configurable system response for redundant entity disagreement regarding system state; a defined system capability pool based on separate redundant entity capabilities; and/or a distributed, unified software solution.

In some embodiments, the systems and methods described herein may be configured to provide distributed system state estimation. The systems and methods described herein may be configured to receive, from each signal path of a plurality of signal paths associated with a computing system, a quality indicator and a partial redundancy classifier. The computing system may be associated with one or more vehicle systems of a vehicle, such as a steering system, a brake system, and/or any other suitable vehicle system. The steering system may include an EPS steering, a SbW steering system, a hydraulic steering system, or other suitable steering system. The signal paths of the plurality of signal paths may be associated with torque scaling, torque rate, damping, mode enablement, and/or the like.

The systems and methods described herein may be configured to generate, for each signal path of the plurality of signal paths, a communication interface qualifier and a system redundancy diagnostic status based on the quality indicator and the partial redundancy classifier.

The systems and methods described herein may be configured to receive system availability information for at least one component associated with a respective signal path. The systems and methods described herein may be configured to determine, for the respective signal path, a redundancy topology classification and a redundancy state based on the system availability information for the at least one component associated with the respective signal path, the communication interface qualifier for the respective signal path, and the system redundancy diagnostic status for the respective signal path.

The systems and methods described herein may be configured to receive, for the respective signal path, resource availability status information. The systems and methods described herein may be configured to generate, for the respective signal path, a redundant system response based on the resource availability status information for the respective signal path, the redundancy topology classification for the respective signal path, and the redundancy state for the respective signal path.

The systems and methods described herein may be configured to, in response to a detected condition, selectively control at least one component of the computing system based on the redundant system response.

Figure 1:
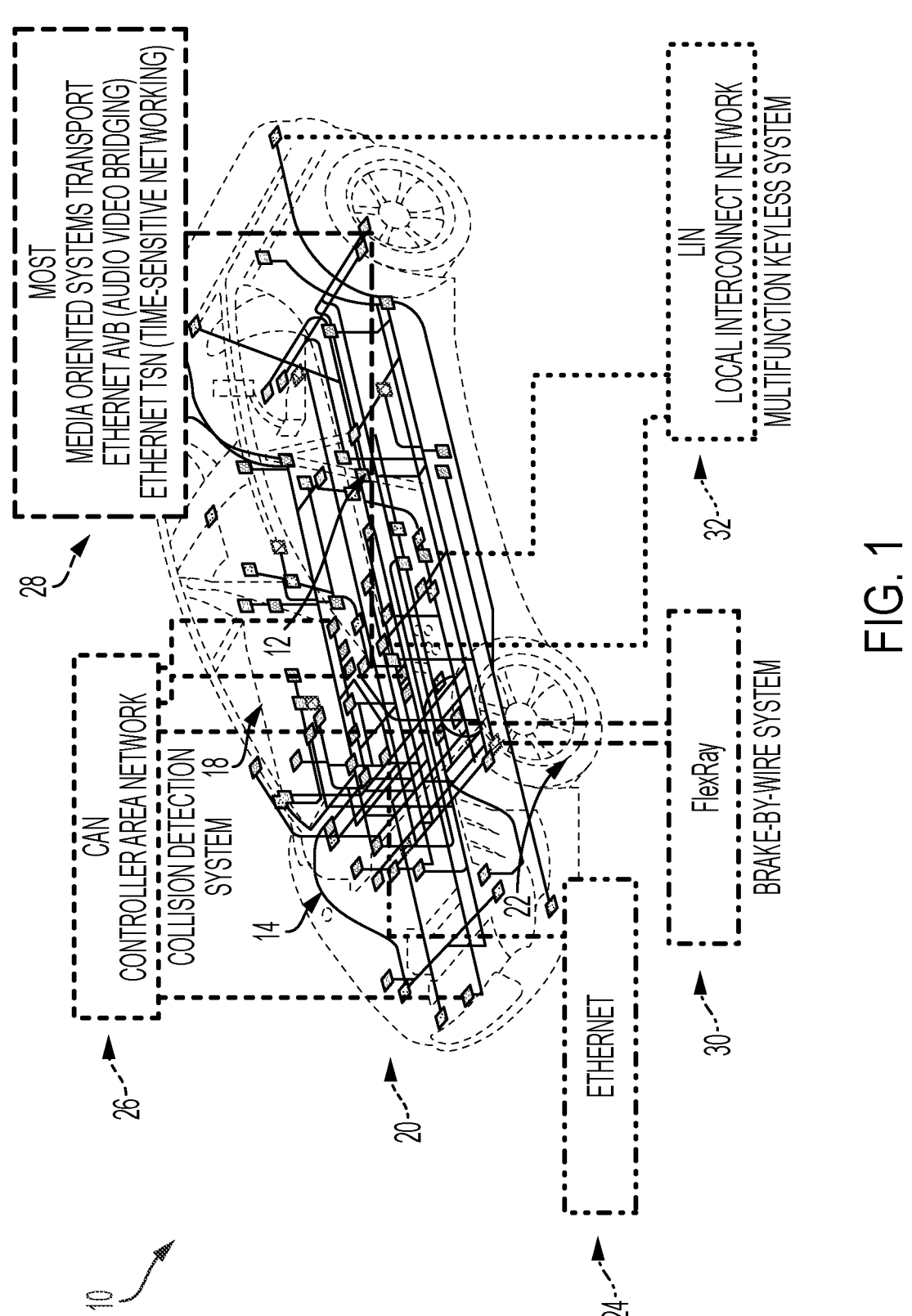
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a handwheel, and other such components are disposed in the passenger compartment 18 of the vehicle 10. The propulsion controls may be actuated or controlled by a operator of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), a hydraulic steering system (e.g., which may include a magnetic actuator incorporated into a valve assembly of the hydraulic steering system), or other suitable steering system.

The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof.

Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
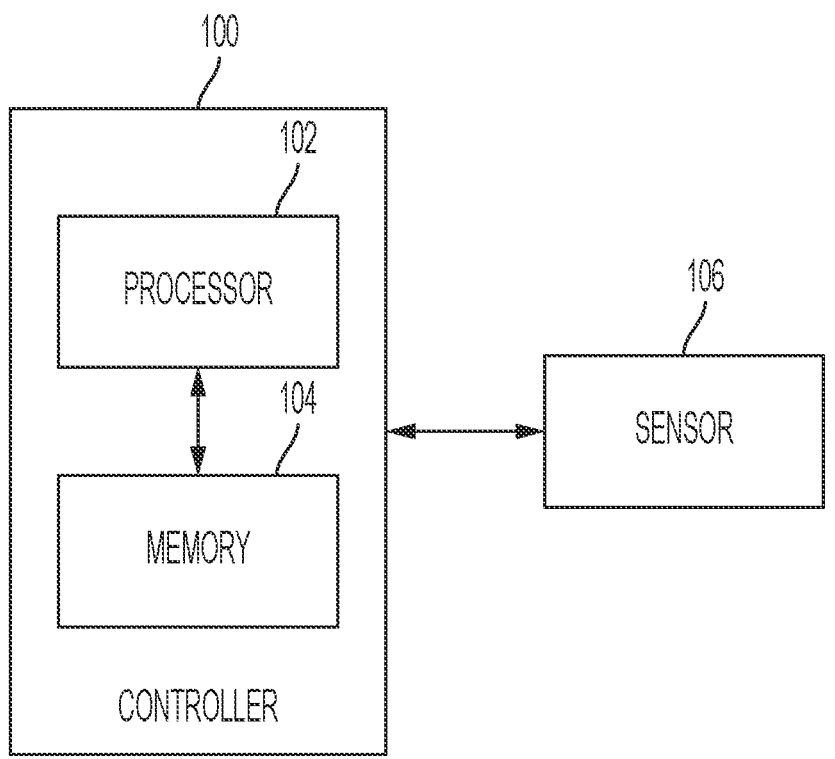
FIG. 2 generally illustrates a controller according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, one or more radar sensors or devices, one or more lidar sensors or devices, one or more sonar sensors or devices, one or more image capturing sensors or devices, other suitable sensors or devices, or a combination thereof. The one or more signals may indicate a handwheel torque, a handwheel angle, a motor velocity, a vehicle speed, other suitable information, or a combination thereof.

The controller 100 may be configured to provide distributed system state estimation. For example, the controller 100 may receive, from each signal path of a plurality of signal paths associated with a computing system, a quality indicator and a partial redundancy classifier. The computing system may be associated with one or more vehicle systems of the vehicle 10, such as the steering system, the brake system, and/or any other suitable vehicle system. The steering system may include an EPS steering, a SbW steering system, a hydraulic steering system, or other suitable steering system. The signal paths of the plurality of signal paths may be associated with torque scaling, torque rate, damping, mode enablement, and/or the like.

The controller 100 may generate, for each signal path of the plurality of signal paths, a communication interface qualifier and a system redundancy diagnostic status based on the quality indicator and the partial redundancy classifier.

The controller 100 may receive system availability information for at least one component associated with a respective signal path. The controller 100 may determine, for the respective signal path, a redundancy topology classification and a redundancy state based on the system availability information for the at least one component associated with the respective signal path, the communication interface qualifier for the respective signal path, and the system redundancy diagnostic status for the respective signal path.

The controller 100 may o receive, for the respective signal path, resource availability status information. The controller 100 may generate, for the respective signal path, a redundant system response based on the resource availability status information for the respective signal path, the redundancy topology classification for the respective signal path, and the redundancy state for the respective signal path.

The controller 100 may, in response to a detected condition, selectively control at least one component of the computing system based on the redundant system response.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

FIG. 6 generally illustrates a distributed system state estimation method 300, according to the principles of the present disclosure. At 302, the method 300 receives, from each signal path of a plurality of signal paths associated with a computing system, a quality indicator and a partial redundancy classifier. For example, the controller 100 may receive, from each signal path of the plurality of signal paths associated with the computing system, the quality indicator and the partial redundancy classifier.

At 304, the method 300 generates, for each signal path of the plurality of signal paths, a communication interface qualifier and a system redundancy diagnostic status based on the quality indicator and the partial redundancy classifier. For example, the controller 100 may generate, for each signal path of the plurality of signal paths, the communication interface qualifier and the system redundancy diagnostic status based on the quality indicator and the partial redundancy classifier.

At 306, the method 300 receives system availability information for at least one component associated with a respective signal path. For example, the controller 100 may receive the system availability information for at least one component associated with the respective signal path.

At 308, the method 300 determines, for the respective signal path, a redundancy topology classification and a redundancy state based on the system availability information for the at least one component associated with the respective signal path, the communication interface qualifier for the respective signal path, and the system redundancy diagnostic status for the respective signal path. For example, the controller 100 may determine, for the respective signal path, the redundancy topology classification and the redundancy state based on the system availability information for the at least one component associated with the respective signal path, the communication interface qualifier for the respective signal path, and the system redundancy diagnostic status for the respective signal path.

At 310, the method 300 receives, for the respective signal path, resource availability status information. For example, the controller 100 may receive, for the respective signal path, the resource availability status information.

At 312, the method 300 generates, for the respective signal path, a redundant system response based on the resource availability status information for the respective signal path, the redundancy topology classification for the respective signal path, and the redundancy state for the respective signal path. For example, the controller 100 may generate, for the respective signal path, the redundant system response based on the resource availability status information for the respective signal path, the redundancy topology classification for the respective signal path, and the redundancy state for the respective signal path.

In some embodiments, a method for distributed system state estimation includes receiving, from each signal path of a plurality of signal paths associated with a computing system, a quality indicator and a partial redundancy classifier. The method also includes generating, for each signal path of the plurality of signal paths, a communication interface qualifier and a system redundancy diagnostic status based on the quality indicator and the partial redundancy classifier. The method also includes receiving system availability information for at least one component associated with a respective signal path, and determining, for the respective signal path, a redundancy topology classification and a redundancy state based on the system availability information for the at least one component associated with the respective signal path, the communication interface qualifier for the respective signal path, and the system redundancy diagnostic status for the respective signal path. The method also includes receiving, for the respective signal path, resource availability status information, and generating, for the respective signal path, a redundant system response based on the resource availability status information for the respective signal path, the redundancy topology classification for the respective signal path, and the redundancy state for the respective signal path.

In some embodiments, the method also includes, in response to a detected condition, selectively controlling at least one component of the computing system based on the redundant system response. In some embodiments, the computing system is associated with one or more vehicle systems of a vehicle. In some embodiments, the one or more vehicle systems of the vehicle includes at least a steering system. In some embodiments, the steering system includes an electronic power steering system. In some embodiments, the steering system includes a steer-by-wire steering system. In some embodiments, the steering system includes a hydraulic steering system. In some embodiments, the one or more vehicle systems includes at least a brake system. In some embodiments, at least one signal path of the plurality of signal paths is associated with torque scaling. In some embodiments, at least one signal path of the plurality of signal paths is associated with torque rate.

In some embodiments, a system for distributed system state estimation includes a processor, and a memory. The memory includes instructions that, when executed by the processor, cause the processor to: receive, from each signal path of a plurality of signal paths associated with a computing system, a quality indicator and a partial redundancy classifier; generate, for each signal path of the plurality of signal paths, a communication interface qualifier and a system redundancy diagnostic status based on the quality indicator and the partial redundancy classifier; receive system availability information for at least one component associated with a respective signal path; determine, for the respective signal path, a redundancy topology classification and a redundancy state based on the system availability information for the at least one component associated with the respective signal path, the communication interface qualifier for the respective signal path, and the system redundancy diagnostic status for the respective signal path; receive, for the respective signal path, resource availability status information; and generate, for the respective signal path, a redundant system response based on the resource availability status information for the respective signal path, the redundancy topology classification for the respective signal path, and the redundancy state for the respective signal path.

In some embodiments, the instructions further cause the processor to, in response to a detected condition, selectively control at least one component of the computing system based on the redundant system response. In some embodiments, the computing system is associated with one or more vehicle systems of a vehicle. In some embodiments, the one or more vehicle systems of the vehicle includes at least a steering system. In some embodiments, the steering system includes an electronic power steering system. In some embodiments, the steering system includes a steer-by-wire steering system. In some embodiments, the steering system includes a hydraulic steering system. In some embodiments, the one or more vehicle systems includes at least a brake system. In some embodiments, at least one signal path of the plurality of signal paths is associated with torque scaling.

In some embodiments, an apparatus for distributed system state estimation includes a processor, and a memory. The memory includes instructions that, when executed by the processor, cause the processor to: receive, from each signal path of a plurality of signal paths associated with a vehicle, a quality indicator and a partial redundancy classifier; generate, for each signal path of the plurality of signal paths, a communication interface qualifier and a system redundancy diagnostic status based on the quality indicator and the partial redundancy classifier; receive system availability information for at least one component associated with a respective signal path; determine, for the respective signal path, a redundancy topology classification and a redundancy state based on the system availability information for the at least one component associated with the respective signal path, the communication interface qualifier for the respective signal path, and the system redundancy diagnostic status for the respective signal path; receive, for the respective signal path, resource availability status information; generate, for the respective signal path, a redundant system response based on the resource availability status information for the respective signal path, the redundancy topology classification for the respective signal path, and the redundancy state for the respective signal path; and, in response to a detected condition, selectively control at least one component of the vehicle based on the redundant system response.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method for distributed system state estimation, the method comprising, at a controller:

receiving, from each signal path of a plurality of signal paths associated with a computing system of vehicle, a quality indicator and a partial redundancy classifier;

generating, for each signal path of the plurality of signal paths, a communication interface qualifier and a system redundancy diagnostic status based on the quality indicator and the partial redundancy classifier;

receiving system availability information for at least one component associated with a respective signal path;

determining, for the respective signal path, a redundancy topology classification and a redundancy state based on the system availability information for the at least one component associated with the respective signal path, the communication interface qualifier for the respective signal path, and the system redundancy diagnostic status for the respective signal path;

receiving, for the respective signal path, resource availability status information;

generating, for the respective signal path, a redundant system response based on the resource availability status information for the respective signal path, the redundancy topology classification for the respective signal path, and the redundancy state for the respective signal path;

controlling at least one aspect of the vehicle associated with the computer system based on the redundant system response.

2. The method of claim 1, further comprising, in response to a detected condition, selectively controlling at least one component of the computing system based on the redundant system response.

3. The method of claim 1, wherein the computing system is associated with one or more vehicle systems of the vehicle.

4. The method of claim 3, wherein the one or more vehicle systems of the vehicle includes a sensor.

5. The method of claim 4, wherein the sensor includes a torque sensor.

6. The method of claim 4, wherein the sensor includes a handwheel position sensor.

7. The method of claim 4, wherein the sensor includes a position sensor.

8. The method of claim 3, wherein the one or more vehicle systems includes at least a brake system.

9. The method of claim 1, wherein at least one signal path of the plurality of signal paths is associated with torque scaling.

10. The method of claim 1, wherein at least one signal path of the plurality of signal paths is associated with torque rate.

11. A system for distributed system state estimation, the system comprising:

a processor; and a memory including instructions that, when executed by the processor, cause the processor to:

receive, from each signal path of a plurality of signal paths associated with a computing system of a vehicle, a quality indicator and a partial redundancy classifier;

generate, for each signal path of the plurality of signal paths, a communication interface qualifier and a system redundancy diagnostic status based on the quality indicator and the partial redundancy classifier;

receive system availability information for at least one component associated with a respective signal path;

determine, for the respective signal path, a redundancy topology classification and a redundancy state based on the system availability information for the at least one component associated with the respective signal path, the communication interface qualifier for the respective signal path, and the system redundancy diagnostic status for the respective signal path;

receive, for the respective signal path, resource availability status information;

generate, for the respective signal path, a redundant system response based on the resource availability status information for the respective signal path, the redundancy topology classification for the respective signal path, and the redundancy state for the respective signal path control at least one aspect of the vehicle associated with the computer system based on the redundant system response.

12. The system of claim 11, wherein the instructions further cause the processor to, in response to a detected condition, selectively control at least one component of the computing system based on the redundant system response.

13. The system of claim 11, wherein the computing system is associated with one or more vehicle systems of the vehicle.

14. The system of claim 13, wherein the one or more vehicle systems of the vehicle includes a sensor.

15. The system of claim 14, wherein the sensor includes a torque sensor.

16. The system of claim 14, wherein the sensor includes a handwheel position sensor.

17. The system of claim 4, wherein the sensor includes a position sensor.

18. The system of claim 13, wherein the one or more vehicle systems includes at least a brake system.

19. The system of claim 11, wherein at least one signal path of the plurality of signal paths is associated with torque scaling.

20. An apparatus for distributed system state estimation, the apparatus comprising:

a processor; and a memory including instructions that, when executed by the processor, cause the processor to:

receive, from each signal path of a plurality of signal paths associated with a vehicle, a quality indicator and a partial redundancy classifier;

generate, for each signal path of the plurality of signal paths, a communication interface qualifier and a system redundancy diagnostic status based on the quality indicator and the partial redundancy classifier;

receive system availability information for at least one component associated with a respective signal path;

determine, for the respective signal path, a redundancy topology classification and a redundancy state based on the system availability information for the at least one component associated with the respective signal path, the communication interface qualifier for the respective signal path, and the system redundancy diagnostic status for the respective signal path;

receive, for the respective signal path, resource availability status information;

generate, for the respective signal path, a redundant system response based on the resource availability status information for the respective signal path, the redundancy topology classification for the respective signal path, and the redundancy state for the respective signal path; and in response to a detected condition, selectively control at least one component of the vehicle based on the redundant system response.

* * * * *